(12) United States Patent
de Dinechin et al.

(10) Patent No.: US 7,478,394 B1
(45) Date of Patent: Jan. 13, 2009

(54) CONTEXT-CORRUPTING CONTEXT SWITCHING

(75) Inventors: Christophe de Dinechin, Sunnyvale, CA (US); Jean-Marc Chevrot, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1637 days.

(21) Appl. No.: 09/873,875

(22) Filed: Jun. 4, 2001

(51) Int. Cl.
*G06F 9/46* (2006.01)
*G06F 9/455* (2006.01)
*G06F 7/04* (2006.01)
*G06F 9/44* (2006.01)

(52) U.S. Cl. .................. 718/108; 718/1; 712/228; 726/21

(58) Field of Classification Search ............. 718/1, 718/100, 102, 103, 107, 108; 712/42, 240, 712/28.228, 228; 710/264, 261; 726/21
See application file for complete search history.

(56) References Cited

U.S. PATENT DOCUMENTS

| | | | | |
|---|---|---|---|---|
| 4,435,753 A * | 3/1984 | Rizzi | ............ | 717/153 |
| 4,761,733 A * | 8/1988 | McCrocklin et al. | ........ | 711/212 |
| 4,787,031 A * | 11/1988 | Karger et al. | ............ | 718/100 |
| 5,043,878 A * | 8/1991 | Ooi | ............ | 712/42 |
| 5,161,226 A * | 11/1992 | Wainer | ............ | 710/264 |
| 5,634,046 A * | 5/1997 | Chatterjee et al. | ............ | 712/227 |
| 5,694,606 A * | 12/1997 | Pletcher et al. | ............ | 710/261 |
| 5,764,969 A * | 6/1998 | Kahle et al. | ............ | 712/228 |
| 5,872,963 A * | 2/1999 | Bitar et al. | ............ | 712/233 |
| 6,047,307 A * | 4/2000 | Radko | ............ | 718/100 |
| 6,061,709 A * | 5/2000 | Bronte | ............ | 718/103 |
| 6,078,970 A * | 6/2000 | Nordstrom et al. | ............ | 710/19 |
| 6,145,049 A * | 11/2000 | Wong | ............ | 710/267 |
| 6,195,676 B1 * | 2/2001 | Spix et al. | ............ | 718/107 |
| 6,199,143 B1 * | 3/2001 | Segal | ............ | 711/120 |
| 6,223,208 B1 * | 4/2001 | Kiefer et al. | ............ | 718/108 |
| 6,233,678 B1 * | 5/2001 | Bala | ............ | 712/240 |
| 6,269,391 B1 * | 7/2001 | Gillespie | ............ | 718/100 |
| 6,298,431 B1 * | 10/2001 | Gottlieb | ............ | 712/28 |
| 6,374,286 B1 * | 4/2002 | Gee et al. | ............ | 718/108 |
| 6,408,325 B1 * | 6/2002 | Shaylor | ............ | 718/108 |
| 6,496,847 B1 * | 12/2002 | Bugnion et al. | ............ | 718/1 |
| 6,510,448 B1 * | 1/2003 | Churchyard | ............ | 718/108 |
| 6,675,238 B1 * | 1/2004 | Coffman et al. | ............ | 710/46 |
| 6,697,935 B1 * | 2/2004 | Borkenhagen et al. | ............ | 712/228 |
| 6,751,737 B1 * | 6/2004 | Russell et al. | ............ | 726/34 |
| 7,043,725 B1 * | 5/2006 | Krishnan et al. | ............ | 718/1 |
| 7,171,547 B1 * | 1/2007 | Thangadurai et al. | ............ | 712/228 |
| 2001/0008563 A1 * | 7/2001 | Yamaura et al. | ............ | 382/162 |
| 2002/0052993 A1 * | 5/2002 | Dowling | ............ | 710/260 |
| 2002/0116436 A1 * | 8/2002 | Whitton | ............ | 709/100 |
| 2002/0188822 A1 * | 12/2002 | Edwards et al. | ............ | 712/1 |

* cited by examiner

*Primary Examiner*—Meng-Ai An
*Assistant Examiner*—Jennifer N To

(57) ABSTRACT

A virtual machine application interrupts execution of a host OS under software control at a predetermined interruption point, instead of interrupting the execution at an arbitrary instruction. The context of the host OS is saved by using an inconsequential register as temporary storage. Context of the host OS is restored by using an inconsequential register as temporary storage.

25 Claims, 2 Drawing Sheets

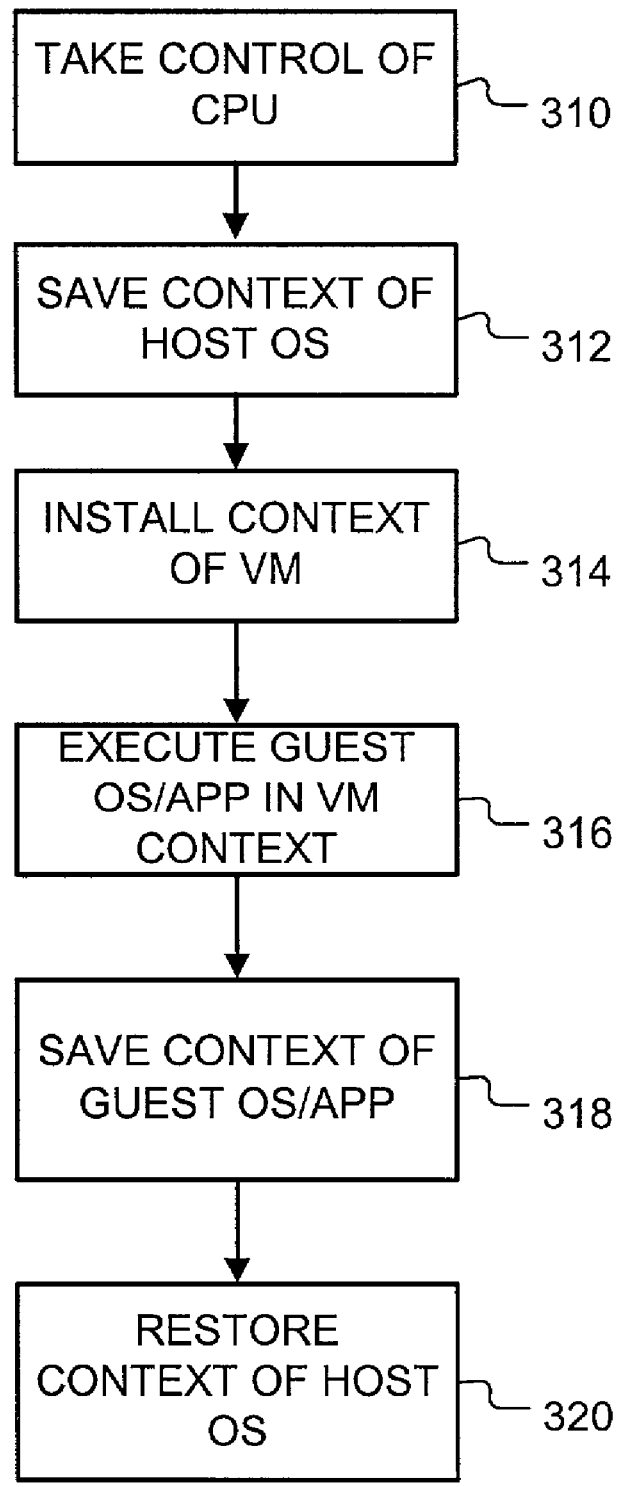

CONTEXT-CORRUPTING CONTEXT SWITCHING

BACKGROUND

An operating system (OS) can be run as application on a computer using a virtual machine. The OS that is run as the application is referred to as the "guest OS," and the underlying OS is referred to as the "host OS." For example, a Windows-based OS can be run as an application on top of a host Linux OS. Running the Windows-based OS as an application allows programs written for a Windows environment to be run on top of the host Linux OS.

The guest OS usually has a different "context" than the host OS. A context embodies the accessible state of the computer's central processing unit (CPU). The context includes in particular the values of CPU registers. It does not include resources that the CPU would not allow currently executing code to access.

The values of certain registers may need to be different to execute the guest OS than to execute the host OS. The virtual machine can allow the guest OS and the host OS to run concurrently by properly restoring the context of the guest OS whenever control is transferred from the host OS to the guest OS, and by similarly restoring the context of the host OS when control is transferred from the guest OS to the host OS. This process is called "context switching", and is similar in principle to switching the context between applications in time-shared environments. Most CPU architectures offer built-in support for switching context between applications, making it possible to completely save and restore the context of any application. This support often includes saving selected CPU resources when an interruption occurs, and reserving certain registers for use only by the OS.

Certain CPU architectures, such as IA-64, have prohibitions against, and difficulties with, completely saving and restoring the entire context of the guest OS or host OS. Specifically, certain registers might be corrupted by the context switching process. If the entire context cannot be saved, the guest OS or host OS might behave incorrectly and crash.

SUMMARY

According to one aspect of the present invention, context is switched on a processor by saving the context under software control using an inconsequential register as temporary storage; and preventing the processor from changing the context while the context is being saved. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is a flowchart of steps performed during a context switch.

DETAILED DESCRIPTION

Figure 1:
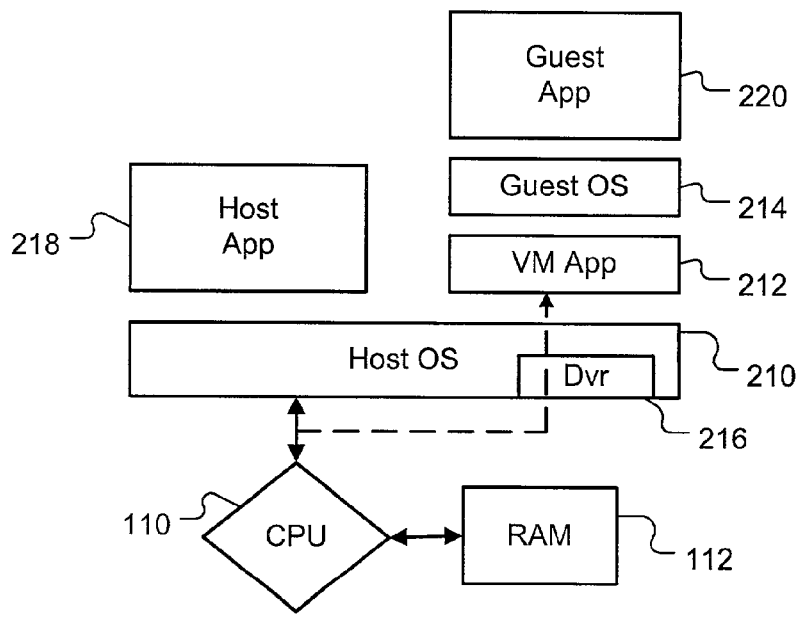
FIG. 1 is an illustration of hardware and software components of a computer.

As shown in the drawings for purposes of illustration, the present invention is embodied in a computer including a CPU and software components including a host OS, and a virtual machine (VM) application. The host OS creates an environment in which applications (such as the VM application) can run. The VM application, when executed, changes the environment created by the host OS to a different environment. The virtual machine enables execution of programs that are written to run in that different environment.

One well-known type of virtual machine is a Java virtual machine. A program such as a Java program would see only the Java environment, even though the host OS created a different environment (e.g., a Windows-based or Unix-based environment). The Java virtual machine "emulates" a CPU by translating Java bytecode into native code, and running the native code on the CPU. Although the present invention may be applied to such a virtual machine, it is not so limited. The present invention may be applied to a virtual machine that does not perform CPU emulation. An advantage of a VM that does not perform CPU emulation is that programs are mostly run "native" and, hence, at full speed. Such a virtual machine can be used to run applications for one operating system on top of a different operating system for the same processor, for instance running Windows applications in a Windows environment created by a virtual machine running on Linux. This is achieved by running the guest OS inside the virtual machine.

The context switching will now be described in connection with a simple CPU having three application-accessible registers I, J and K, and a privileged register X (later, the context switching will be expanded to cover the IA-64 processor). The CPU controls access to the privileged register X based on the Privilege Level (PL) at which code executes. PL0 is the highest privilege, and is used for operating system code. PL3 is the lowest privilege, and is used for application code. Code running at PL0 is called privileged code.

A write operation by the CPU may involve at least two registers. One register stores a target address and at least one other register stores values to be written to the target address.

Reference is made to FIG. 1, which shows different hardware and software components of a computer. The hardware components include a CPU 110 and random access memory (RAM) 112. A host OS 210 runs at PL0 and, therefore has full access to the CPU 110 of the computer, and in particular to the privileged register X. For correct execution of applications, the host OS 210 is responsible for saving and restoring any application-visible processor state not automatically saved by the CPU 110. This includes the values of the application-accessible registers I, J and K. However, the host OS 210 in general, and interrupt handling routines in particular, are free to use the privileged register X.

Host and guest applications 218 and 220 normally run at a lower privilege, such as PL3. The host OS 210 does not allow the host and guest applications 218 and 220 to access the privileged register X.

The host OS 210 runs PL0 code and uses the privileged register X as temporary storage to switch context to and from host and guest applications 218 and 220. Context switching between applications can occur at any time, for instance in response to an interrupt. Consider the following example of switching between applications A and B. When an interrupt occurs, the host OS 210 performs the following:

X=address of application A context store I, J, K to X

X=address of application B context load I, J, K from X     [1]

The address stored in register X is typically an address in RAM 112. Later, the host OS 210 restores the context of application A with the same process, which ends with:

X=address of application A context load I, J, K from X

Had application A stored a value in the privileged register X, that value would have been lost during the context switching. However, the host OS 210 prevents application A from using the privileged register; therefore, the context of application A (that is, the values of the application-accessible registers I, J and K) is identical before and after the interruption.

Thus, application context switching destroys the value of the privileged register X. However, since the host and guest applications 218 and 220 cannot access the privileged register X, they are not affected by context switching.

Destroying the value of the privileged register X creates a problem if an attempt is made to switch context between the host OS 210 and a guest OS 214. The context of the host OS 210 includes the privileged register X as well as the application-specific registers I, J and K. During the context switch, the privileged register X would be used to specify the target address of the other registers I, J and K. However, once the privileged register X is modified, the context of the host OS 210 is modified and cannot be restored in its entirety. Corrupting the privileged register X would change the behavior of the host OS 210 upon restoration and cause it to crash A virtual machine application 212 and driver 216 are used to avoid this problem. When executed, the virtual machine application 212 changes the environment created by the host OS to a different environment, that of a virtual machine (VM). The driver 216 runs in the most-privileged mode PL0. The virtual machine application 212, which initially runs at PL3, invokes the driver 216 to take control of the CPU 110. The VM application 212 may invoke the driver 216 by using a host API such as "ioctl" (for a UNIX-based OS) or "DeviceControl" (for a Windows-based OS). The driver 216 allows the virtual machine application 212 to access the privileged register X and therefore use it as temporary storage.

The guest OS 214 runs in the VM at PL1 instead of PL0. Therefore, the guest OS 214 has only partial access to the CPU 110 and can only access the privileged register X through the VM. One of the roles of the VM is to simulate accesses to the privileged register X made by the guest OS 214, as if the guest OS 214 were running normally at PL0.

FIG. 2 illustrates the operation of the VM application 212 in connection with a context switch between the host OS 210 and the guest OS 214. Before the context is switched from the host OS 210 to the guest OS 214, the VM application 212 temporarily disables the interrupts (310) to prevent the privileged register X from being corrupted during the context switching. For instance, disabling the interrupts during the context switch would prevent interrupt handlers from changing the value of the privileged register X.

Next, the virtual machine application 212 saves the context of the host OS (312) using an inconsequential register as temporary storage. The point at which the host OS context is saved is under software control (synchronous) rather than under control of an external event such as a timer (asynchronous). This point will therefore be referred to as a predetermined interruption point (PIP). An inconsequential register is a register that is not used by the host OS 210 at the PIP.

Since the context of the host OS 210 is saved at the PIP, it is known which registers the host OS 210 uses and which registers the host OS 210 does not use. Therefore, the inconsequential register(s) at the PIP can be identified. The inconsequential registers can be corrupted by the virtual machine application 212 without affecting the host OS 210. In particular, the context switching process can use the inconsequential registers as a temporary storage in lieu of the privileged registers.

For example, if register I is an inconsequential register at the PIP, the context of the host OS 210 may be saved as follows.

I=address of OS A context store X, J, K to I switch to context of virtual machine [2]

Switching the context to the VM (314) corrupts the registers I, J, K and X with random values. However, the contents of registers J, K and X were stored at the address indicated by register I. Since I is an inconsequential register, the entire meaningful context of the host OS 210 is saved.

Once the context has been switched to that of the virtual machine, the guest OS 214 may be run as an application (316), under control of the virtual machine. At that point, the virtual machine has taken over CPU ownership normally assumed by the host OS 210. The virtual machine saves the context of the guest OS 214 just like the host OS 210 would for a host application 218.

The VM application 212 may relinquish control of the CPU 110 to the host OS 210 at any time, for instance in response to a timer interrupt that indicates the end of the time slice allotted to the VM application 212. When a switch is made from the VM context back to the host OS 210, the virtual machine application 212 saves the context of the guest OS (318). Since the guest OS 214 runs unprivileged, saving the guest OS context is similar to saving the context of an application, and can make use of the same kind of reserved resources (except that they are at this point reserved to the virtual machine rather than to the host OS).

On the other hand, restoring the host OS context (320) requires restoration of the privileged register X. The virtual machine application 212 cannot use the privileged register, but it can (and does) use the inconsequential register(s) as temporary storage.

Continuing with the example above, the context of the host OS 210 may be restored as follows.

I=address of OS A context load X, J, K from I[3]

Thus the value of the privileged register X is now correctly preserved.

Later, control may be returned to a known point [4], at which execution of the virtual machine application 212 or driver 216 resumes, now under control of the host OS 210. If the value of register I was saved separately by a software convention between points [2] and [4], the register I can be used to pass additional information back to the virtual machine application.

Figure 3:
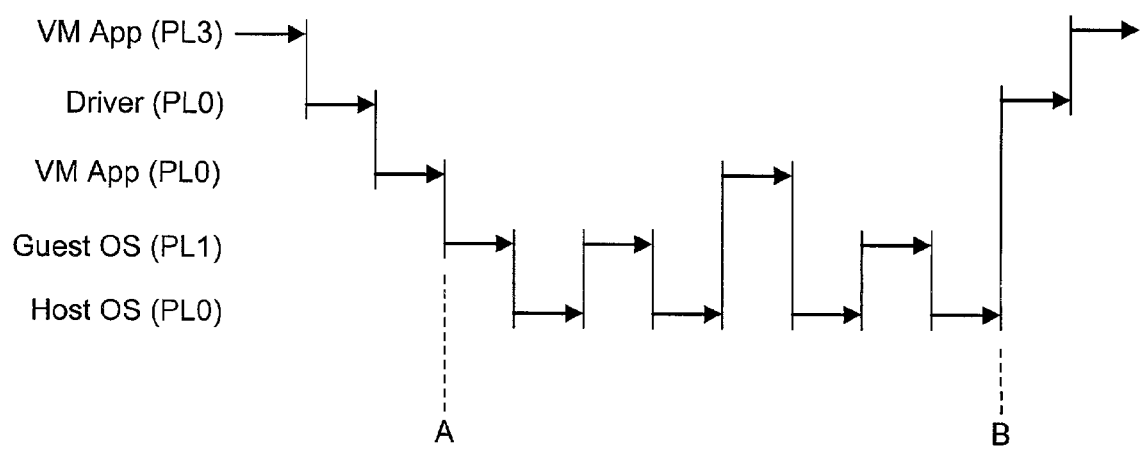
FIG. 3 is an illustration of context switches between a host operating system, a virtual machine, and a guest operating system.

FIG. 3 provides an example of a series of context switches. The VM application 212 is started at PL3 and calls the driver 216, which is running at PL0. The driver 216 allows the VM application 212 to take control of the CPU 110. The virtual machine is activated at point A. Between points A and B, the context of the host OS 210 is preserved in RAM 112 or other storage by the virtual machine. At point B the virtual machine saves the context of the guest OS 214, the context of the host OS 210 is restored, the virtual machine is exited and control of the CPU 110 is returned to the host OS 210.

The simple CPU 110 was used to facilitate an understanding of the context switching according to the present invention. The context switching may be applied to a processor such as the IA-64 processor. The IA-64 processor includes general registers (GR) containing integer values, branch registers (BR) containing the address of code to branch to, control registers (CR) with specialized roles, reserved for use by operating systems, and banked general registers (BGR) which only an OS can use. By software convention, some of these registers are caller-save (scratch) registers. The IA-64 processor controls access to the control registers (CR) and the banked general registers (BGR) based on the PL. Therefore, the control registers (CR) and the banked general registers (BGR) are privileged registers. The general registers (GR) and the branch registers (BR) are application-accessible registers.

For correct execution of applications, the host OS is responsible for saving and restoring any application-visible processor state not automatically saved by the IA-64 processor. This includes the values of the general and branch registers (GR and BR). However, the host OS in general, and interrupt handling routines in particular, are free to use the control registers (CR) and the banked general registers (BGR)

Caller-save registers, also called scratch registers, are of particular interest. By software convention, these registers are modified arbitrarily across a call. Thus, code is not allowed to use their value immediately after a call. If the PIP is made to be the instruction following a call, then the virtual machine is allowed to corrupt all scratch registers. There is no restriction in making the PIP immediately follow a call to a context saving routine. This technique makes all scratch registers available to the VM application.

Branch registers also present a special interest. It may be necessary or practical for the virtual machine to corrupt at least one branch register in the host OS context. If the virtual machine returns control to the host OS at an address that is computed during runtime, an indirect branch might be used to vector to the target address. This target address is computed during runtime to select one of multiple possible choices (e.g., different interrupt handlers). The indirect branch can also be used to avoid branch distance limitations that exist on some CPUs such as the Itanium implementation of the IA-64 architecture. On most RISC CPUs and on IA-64, this indirect branch will corrupt at least one register. Any branch register that is ignored at the PIP can be used. The return branch register (branch register 0 on IA-64) is a scratch register, since it is corrupted by the return of the call. Thus, if the PIP is an instruction following a call, it is possible for the virtual machine to corrupt this branch register as part of its execution.

The present invention is not limited to resuming execution precisely at the PIP. Execution may resume at any point different than the PIP, as long as the selected resumption point does not use the registers that the virtual machine may have corrupted. The virtual machine may use this possibility to dynamically select a different resumption point for different return paths to the host OS.

The present invention is not limited to the IA-64 architecture and may be applied to any other CPU architecture having registers reserved for use by the operating system and limitations on saving and restoring all registers that an operating system can access.

The present invention is not even limited to CPU architectures having registers reserved for use by the operating system and limitations on saving and restoring all registers that an operating system can access. It may be applied to CPU architectures that make all registers available, without restriction. All registers could be correctly saved and restored, but saving or restoring only part of them may still be more efficient. Efficiency may be increased by saving and restoring a smaller number of registers because this frees up additional registers for the interrupting code, or both. Thus, the present invention may allow more efficient management of the registers.

The manner in which the CPU is prevented from changing the context while the context is being saved is a matter of design choice. The manner described above (running a driver at PL0 to gain access to the privileged registers and disable the interrupts) is but one example.

Although the present invention was described in connection with a virtual machine application, it is not so limited. The virtual machine application is but one example of an application that needs to inject code without disturbing the surrounding context. The present invention may be used by any other software application that needs to execute code without disturbing a surrounding context. Other examples of such applications include debuggers, performance measurement tools, profiling tools, etc.

The present invention is not limited to the specific embodiments described and illustrated above. Instead, the present invention is construed according to the claims that follow.

What is claimed is:

1. A method of switching context on a processor, the method comprising:
    saving the context under software control using an inconsequential register;
    preventing the processor from changing the context while the context is being saved; and
    thereafter restoring the context using an inconsequential register.

2. The method of claim 1, wherein the inconsequential register is used as a temporary storage in lieu of a privileged register.

3. The method of claim 1, wherein the context is saved at a predetermined interruption point.

4. The method of claim 1, wherein the context is switched between a host operating system and a virtual machine application, the virtual machine application controlling the context switch.

5. The method of claim 4, wherein the inconsequential register is used to pass information to the virtual machine application.

6. The method of claim 1, wherein the context is switched using an IA-64 processor.

7. The method of claim 6, wherein the inconsequential register is a caller-save register.

8. The method of claim 6, wherein the inconsequential register is a branch register.

9. The method of claim 1, wherein the context is restored by using a branch register to perform an indirect branch.

10. The method of claim 1, wherein content of the inconsequential register is corrupted during the context switch.

11. The method of claim 1, wherein using the inconsequential register includes storing an address in the inconsequential register, the address indicating a memory location at which the context will be saved.

12. The method of claim 1, wherein the inconsequential register does not store context at a predetermined interruption point.

13. The method of claim 1, wherein the context is stored in memory other than the inconsequential register.

14. A method of switching context between a host OS and a virtual machine on a processor, the processor having privileged registers, the processor having access to other memory, the method comprising:
    giving the virtual machine access to the privileged registers;

using at least one privileged register as temporary storage to save the context in the other memory at a predetermined interruption point;

preventing the processor from changing the context while the context is being saved; and restoring the context using an inconsequential register;

the virtual machine application controlling the context switch.

15. Apparatus comprising:

a processor including a plurality of registers; and a virtual machine application for commanding the processor to switch context by saving the context under software control using an inconsequential register of the processor as temporary storage; and preventing the processor from changing the context while the context is being saved; and to restore context by using the inconsequential register.

16. The apparatus of claim 15, wherein the inconsequential register is used as a temporary storage in lieu of a privileged register.

17. The apparatus of claim 15, wherein the context is saved at a predetermined interruption point.

18. The apparatus of claim 15, further comprising a host OS; wherein the context is switched between the host OS and the virtual machine application; and wherein the virtual machine application controls the context switch.

19. The apparatus of claim 18, wherein the inconsequential register is used to pass information to the virtual machine application.

20. The apparatus of claim 15, wherein the processor is an IA-64 processor.

21. The apparatus of claim 20, wherein the inconsequential register is a caller-save register.

22. The apparatus of claim 20, wherein the inconsequential register is a branch register.

23. The apparatus of claim 15, wherein the virtual machine application commands the processor to restore the context using the inconsequential register as temporary storage.

24. The apparatus of claim 23, wherein the context is restored by using a branch register to perform an indirect branch.

25. An article comprising computer memory encoded with instructions for commanding a processor to switch context by saving the context under software control using an inconsequential register of the processor as temporary storage; and preventing the processor from changing the context while the context is being saved; the instructions further commanding the processor to restore context using the inconsequential register.

* * * * *